United States Patent [19]

West

[11] Patent Number: 4,908,516
[45] Date of Patent: Mar. 13, 1990

[54] APPARATUS AND PROCESS FOR CHECKING THE AUTHENTICITY OF AN ARTICLE HAVING A MAGNETIC STORAGE INFORMATION MEANS

[76] Inventor: Michael A. West, 59 Dale Wood Rd., Orpington Kent, BR6 OBY, United Kingdom

[21] Appl. No.: 150,653
[22] PCT Filed: Apr. 7, 1987
[86] PCT No.: PCT/GB87/00238
§ 371 Date: Jan. 22, 1988
§ 102(e) Date: Jan. 22, 1988
[87] PCT Pub. No.: WO87/07415
PCT Pub. Date: Dec. 3, 1987

[30] Foreign Application Priority Data

May 23, 1986 [GB] United Kingdom ............... 8612693

[51] Int. Cl.⁴ ............................................. G06K 5/00
[52] U.S. Cl. ................................. 250/556; 250/566; 250/458.1; 356/71
[58] Field of Search ............... 250/209, 556, 226, 566, 250/458.1, 459.1; 235/465, 468, 469, 491, 495, 449; 356/71; 282/92

[56] References Cited

U.S. PATENT DOCUMENTS 3,795,805 3/1974 Swanberg et al. ................ 250/209
4,047,033 9/1977 Malmberg et al. ................ 250/341
4,277,689 7/1981 Thomas et al. ..................... 382/59
4,607,160 8/1986 Sakakino ........................... 250/227

FOREIGN PATENT DOCUMENTS 2084929 4/1982 United Kingdom .
2086305 5/1982 United Kingdom .
2094044 9/1982 United Kingdom .
2095822 10/1982 United Kingdom .

OTHER PUBLICATIONS

International Search Report.

Primary Examiner—David C. Nelms
Assistant Examiner—Stephone B. Allen
Attorney, Agent, or Firm—Bernard, Rothwell & Brown

[57] ABSTRACT

Apparatus (2) for characterizing or identifying an article (10) having a magnetic material thereon which stores information relating to the article, the apparatus comprising means (24) for irradiating the article with electromagnetic radiation of a particular spectral characteristic, means (26,28,30) for detecting electromagnetic radiation which is emitted by or reflected from the article due to the irradiation thereof by the means for irradiating, means for determining whether or not the detected radiation has prescribed spectral characteristics thereby to detect whether or not the article is genuine, and a magnetic detector means for reading information which is stored on the magnetic material, the means for detecting being arranged to control the magnetic detector means in response to the detection or whether or not the article is genuine. The invention also provides a method for characterizing or identifying an article having a magnetic material thereon which stores information relating to the article.

15 Claims, 3 Drawing Sheets

APPARATUS AND PROCESS FOR CHECKING THE AUTHENTICITY OF AN ARTICLE HAVING A MAGNETIC STORAGE INFORMATION MEANS

The present invention relates to the verification of a security document or article, e.g. a card such as a credit card, identity card, telephone card, clock card or access control card, having information recorded on a magnetic strip which is disposed on the surface of the document or article.

Plastics cards, such as credit cards, identity cards, telephone cards, clock cards and access control cards, having information recorded on a magnetic strip which is disposed on the surface of the card are well known. The card generally consists of layers of PVC and the magnetic strip is adhered to the outer surface of one face of the card. The magnetic strip is usually not covered by an outer PVC laminating layer. Consequently, counterfeiters have been able to forge such cards by delicately removing the magnetic strip from the card and by adhering the strip to a forged card bearing false markings. Thus, the security of such magnetic strip cards is poor.

So-called magnetic swipe readers are also known for use in reading the magnetic information which is stored (usually on one of four tracks) on the magnetic strip. Such magnetic swipe readers include a slot having disposed therein at one side thereof a magnetic detecting head. The card is passed through the slot and the magnetic strip passes the magnetic detecting head which reads the magnetic information stored on the magnetic strip. However, for the reason discussed above, the security of the magnetic strip cards is poor and so it is relatively easy for a determined counterfeiter to produce a forged card having the correct magnetic information thereon for him to be able to pass the card through a magnetic swipe reader to access the desired service without the forgery being detected.

It is an object of the present invention to increase the security of a document or article having such a magnetic strip and to provide an apparatus and method for verifying whether or not the document or article is genuine.

The present invention provides apparatus for characterising or identifying an article having a magnetic material thereon which stores information relating to the article, the apparatus comprising means for irradiating the article with electromagnetic radiation of a particular spectral characteristic, means for detecting electromagnetic radiation which is emitted by or reflected from the article due to the irradiation thereof by the means for irradiating, means for determining whether or not the detected radiation has prescribed spectral characteristics thereby to detect whether or not the article is genuine, and a magnetic detector means for reading information which is stored on the magnetic material, the means for determining being arranged to control the magnetic detector means in response to the detection of whether or not the article is genuine.

Preferably, the means for detecting electromagnetic radiation comprises a plurality of optical filters each arranged to transmit a different wavelength and a plurality of photo-detectors, each being arranged to receive filtered radiation from a respective optical filter.

The apparatus may further comprise an article detector which detects when an article to be characterised or identified is at a testing station adjacent the means for irradiating and the means for detecting electromagnetic radiation, the article detector being operable to actuate the means for determining when the article is at the testing station.

Desirably, the means for determining is adapted to integrate values which are representative of the intensity of the detected radiation at predetermined wavelengths, to halt the integration of the values when one of the integrated values reaches a predetermined threshold and to compare the final integrated values thereby to determine whether or not the integrated values at the predetermined wavelengths correspond to respective prescribed values.

The present invention further provides a method for characterising or identifying an article having a magnetic material thereon which stores information relating to the article, the method comprising the steps of:

(a) irradiating the article with electromagnetic radiation of a particular spectral characteristic;

(b) detecting electromagnetic radiation which is emitted by or reflected from the article due to the irradiation thereof by the means for irradiating;

(c) determining whether or not the detected radiation has prescribed spectral characteristics thereby to detect whether or not the article is genuine; and (d) reading information which is stored on the magnetic material, the reading step being controlled in response to the detection in the determining step (c) of whether or not the article is genuine.

Preferably, the electromagnetic radiation is detected in step (b) by a plurality of optical filters each arranged to transmit a different wavelength and a plurality of photo-detectors, each being arranged to receive filtered radiation from a respective optical filter.

Advantageously, an article detector is arranged to detect when an article to be characterised or identified is at a testing station at which the article is irradiated in step (a), the article detector being operable to actuate the determining step (c) when the article is at the testing station.

The determining step (c) may comprise the steps of:

(i) integrating values which are representative of the intensity of the detected radiation at predetermined wavelengths;

(ii) halting the integration of the values when one of the integrated values reaches a predetermined threshold; and (iii) comparing the final integrated values thereby to determine whether or not the integrated values at the predetermined wavelengths correspond to respective prescribed values.

The present invention still further provides a security article having a magnetic material thereon which stores information relating to the article and means for reflecting or emitting electromagnetic radiation of prescribed spectral characteristics when the article is irradiated with electromagnetic radiation of a particular spectral characteristic.

Embodiments of the present invention will now be described by way of example only, with reference to the accompanying drawings, in which.

Figure 1:
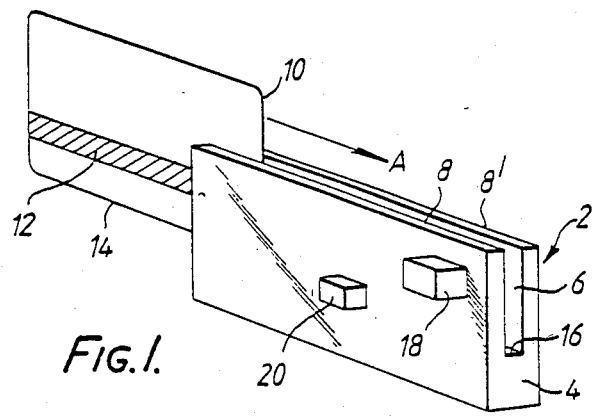
FIG. 1 is a schematic perspective view from one side of a magnetic swipe reader in accordance with a first embodiment of the invention.
Figure 2:
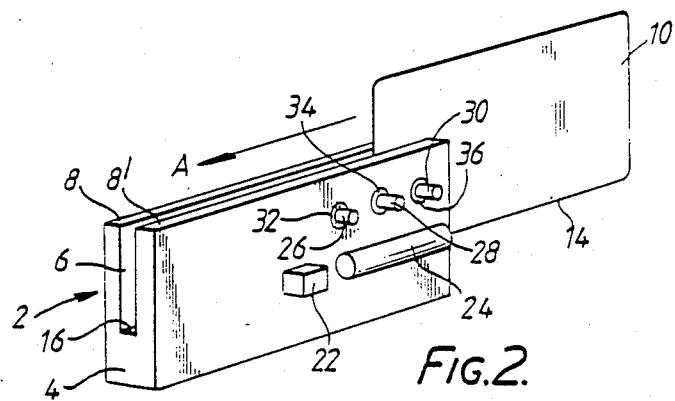
FIG. 2 is a schematic perspective view from the other side of the magnetic swipe reader of FIG. 1.

Referring to FIGS. 1 and 2, a magnetic swipe reader 2 for reading a magnetic strip on a plastics card comprises an elongate channel member 4 having a U-shaped cross-section and having a narrow elongate groove 6 therealong between the two opposed legs 8, 8' of the channel member 4. The width of the groove 6 is only slightly greater than that of a plastics card which is to be read by the magnetic swipe reader 2 so that the card can be passed through the groove with substantially no lateral movement. Typically, the groove 6 is from 2 to 4 mm wide.

As is known to those skilled in the art, a card 10 having a longitudinally oriented magnetic strip 12 disposed on one side thereof is passed e.g. manually, from one end of the groove 6, to the other end of the groove 6 in a predetermined direction, as indicated by arrow A in the drawings. The card 10 is oriented so that the magnetic strip 12 is opposed to a predetermined side of the groove 6 and so that the bottom edge 14 of the card 10 is slid along the bottom face 16 of the groove 6. In this way, it is ensured that the magnetic strip 12 is correctly oriented with respect to a magnetic detecting head 18.

The magnetic detecting head 18 is positioned on the said predetermined side of the groove 6. As the card 10 passes through the magnetic swipe reader 2 in direction A, the magnetic strip 12 passes the magnetic detecting head 18 in a precise manner so that the magnetic detecting head 18 reads the information which is stored magnetically on the magnetic strip 12. The detected information is then employed to control auxilliary equipment such as a telephone, access control system, cash dispensing apparatus, etc.

In accordance with the present invention, the magnetic swipe reader 2 is provided with further information detecting and control devices and the card 10 is provided with a secure material having particular optical spectral characteristics.

The card 10 is formed of a laminate of layers of PVC. At least one of the PVC layers has incorporated homogeneously therein an organic or inorganic substance having certain optical properties. The at least one layer is disposed on that side of the card 10 which does not have the magnetic strip 12 thereon and generally is transparent to visible radiation. However, in an alternative arrangement the at least one layer and the magnetic strip are on the same side of the card. In the preferred embodiment, the substance is a fluorescent material or a mixture of fluorescent materials which is excited by one or more wavelengths of ultraviolet radiation to emit an excitation spectrum in the visible part of the electromagnetic spectrum. In the following description of the illustrated arrangement, the apparatus is arranged to detect the characteristics of the fluorescence emission spectrum of the fluorescent material in the card 10 which is excited at a particular wavelength of ultraviolet radiation. However, other arrangements are possible and will be described hereinafter.

In the magnetic swipe reader 2 an infrared light emitting diode 20 is disposed upstream of and on the same side of the groove 6 as the magnetic detecting head 18. An optical switch 22, which incorporates an infrared sensitive photo-detector (not shown) is located on the other side of the groove 6 and in opposed relation to the infrared light emitting diode 20 whereby a beam of infrared radiation emitted from the infrared light emitting diode 20 is received by the optical switch 22. The infrared light emitting diode 20 is driven by an external power supply (not shown). The infrared light emitting diode 20 and the associated optical switch 22 cooperate to detect the presence of a card 10 in the groove 6 when the card 10 passes between the infrared light emitting diode 20 and the optical switch 22 and thereby prevents infrared radiation from being incident on the optical switch 22. The apparatus is arranged to detect the presence of a card in the groove, and to measure the spectral and magnetic characteristics, over a velocity range of the card of from 12.5 cm/second to 150 cm/second.

A lamp 24, which is typically a low-pressure phosphor-coated mercury lamp which produces an emission almost exclusively in the ultraviolet region of the electromagnetic spectrum, is positioned upstream of, and on the same side of the groove 6 as the optical switch 22. The lamp 24 is adapted to produce an emission with a peak wavelength at, for example, 254, 320 or 366 nm. No significant visible emission is produced by the lamp. Ultraviolet radiation from the lamp 24 irradiates the groove 6 so that when a card 10 is passed through the groove 6 in front of the lamp 24 the ultraviolet radiation is incident on that side of the card 10 which faces the lamp 24. In the illustrated arrangement, the face of the card 10 which receives ultraviolet radiation is that face which does not have the magnetic strip 12 thereon. However, in an alternative arrangement the face of the card which is intended to receive ultraviolet radiation is that which has the magnetic strip 12 thereon.

An array of three photo-detectors 26, 28, 30 is mounted above the lamp 24 and each photo-detector 26, 28, 30 is adapted to detect radiation which is emitted from the card 10 and results from incidence of ultraviolet radiation from the lamp 24 onto the card 10. In the illustrated embodiment, that surface of the card 10 which faces the lamp 24 and the photo-detectors 26, 28, 30 has a fluorescent material incorporated therein and so that radiation which is emitted from the card 10 and received by the photo-detectors 26, 28, 30 is fluorescent radiation, which is typically in the visible region of the electromagnetic spectrum. Each photo-detector 26, 28, 30 has a respective filter 32, 34, 36 positioned in front thereof. Each filter 32, 34, 36 is adapted to transmit only a respective specific wavelength, and a respective specific spectral bandpass, falling within the fluorescent emission spectrum of the fluorescent material in the card 10. The filters 32, 34, 36 thus prevent any ultraviolet radiation from being incident on the photo-detectors 26, 28, 30 and restrict the visible components of the fluorescent radiation which are received by the photo-detectors 26, 28, 30 to respective wavelengths and spectral bandpasses.

Figure 3:
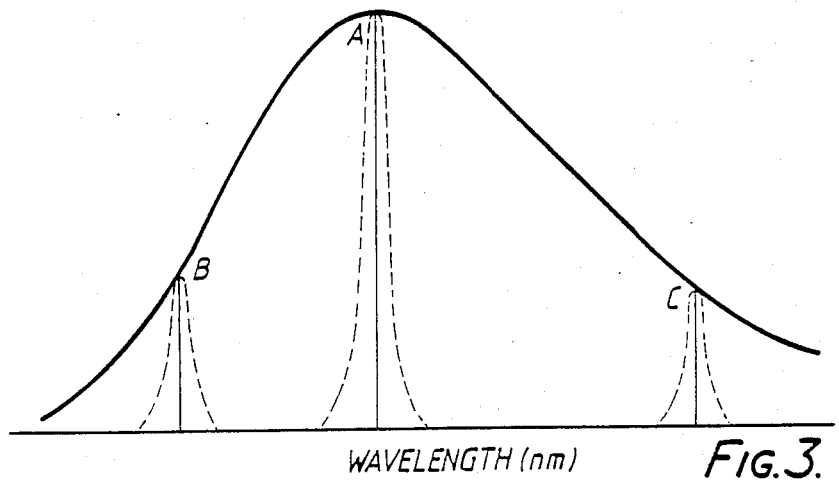
FIG. 3 shows a characteristic emission spectrum from a fluorescent material.

FIG. 3 shows a typical fluorescence emission spectrum of a fluorescent material for incorporation into the card 10 to be detected by the magnetic swipe reader 2 of the illustrated embodiment.

The illustrated embodiment is an apparatus for characterising or identifying a card bearing a fluorescent material which provides a characteristic emission spectrum. The fluorescent materials used with the present invention are selected so that the shape of the wavelength - intensity spectrum is characteristic of the fluorescent material and unique for that material. The intensity of radiation emitted by the fluorescent material is detected at selected wavelengths such as those marked A, B and C in FIG. 3. The relative intensities at these selected wavelengths are compared and the comparison can provide an indication of the nature of the fluorescent material under test or whether or not it is a particular fluorescent material that is being searched for in the test. By comparing the relative intensities at the selected wavelengths, the results obtained are independent of the overall intensity level of the emitted radiation. In this way, variation in the exitation radiation used or any other variable factors such as the precise location or quantity of fluorescent material or changes in the optical detection system used may cause variation in the overall intensity of emitted radiation but will have no effect on the relative magnitudes of the intensities and the selected wavelengths. The filters 32, 34 and 36 are band pass filters selected so that their transmittances do not overlap to any substantial degree and the transmission maximum of one filter corresponds approximately to a maximum on the fluorescence emission spectral curve of the fluorescent material whilst the transmission maxima of the other two filters correspond to any other suitable wavelengths in the spectrum of the fluorescent material and preferably are chosen to lie one on either side of the emission maxima to which one filter approximately corresponds. This is illustrated in FIG. 3 where the three filters may be chosen to correspond to the wavelengths A, B and C respectively.

The photo-detectors 26, 28, 30 each provide an electrical output signal which varies linearly in level in accordance with the intensity of the emitted radiation which is incident thereon. The electrical outputs of the three photo-detectors 26, 28, 30 are coupled to a control circuitry which may be of the type shown in FIG. 4 and will be described hereinbelow. The control circuitry is arranged to modify by attenuation or amplification the signal from one of the photo-detectors and compare the modified signal level with the signal levels derived from the other two photo-detectors. The results of the comparison are used to determine whether the card 10 which is under test contains the correct fluorescent material. Such a determination is then employed to control the magnetic detecting head and its associated control system.

Figure 4:
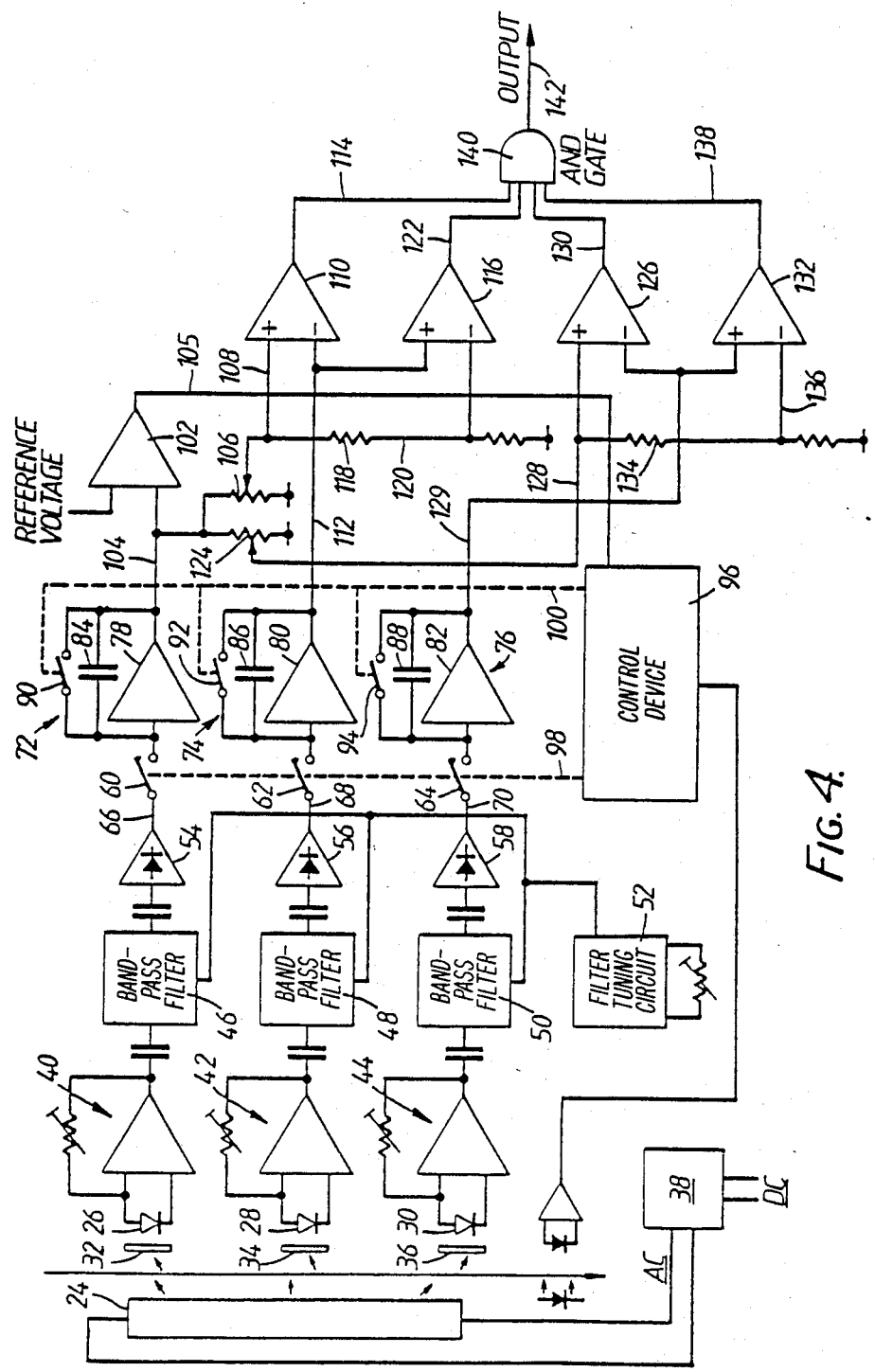
FIG. 4 shows the control circuit used with the magnetic swipe reader of FIG. 1.

Referring to FIG. 4, there is shown the lamp 24 which is connected to a DC/AC inverter 38, the operation frequency of the lamp being from 500 to 1000 Hz. The three photo-detectors 26, 28, 30 each comprise a photo diode and positioned in front of each photo diode 26, 28, 30 is a respective one of the filters 32, 34, 36.

Each photo-detector 26, 28, 30 is connected to a respective adjustable gain pre-amplifier 40, 42, 44. The output of each pre-amplifier 40, 42, 44 is passed through a respective bandpass filter 46, 48, 50 which is tuned to the frequency of the lamp 24 by means of a filter tuning circuit 52. In this way, spurious signals form ambient light (i.e. a DC signal from sunlight or a 50–60 Hz signal from artificial lights) are eliminated. The output of each bandpass filter 46, 48, 50 is then passed to a respective rectification circuit 54, 56, 58 which rectifies the respective high frequency AC signal to DC. Each rectification circuit 54, 56, 58 outputs to a terminal of a respective first switch 60, 62, 64 a respective DC output voltage signal 66, 68, 70 which is representative of the intensity of illumination detected by the respective photodetector 26, 28, 30. In this particular case, the signal 66 corresponds to the intensity of the wavelength marked A in FIG. 3, the signal 68 corresponds to the intensity at the wavelength B, and the signal 70 corresponds to the intensity at the wavelength C. The first switch 60, 62, 64 are initially open.

The other terminal of each of the first switches 60, 62, 64 is connected to a respective integration circuit 72, 74, 76 each of which includes an integration operational amplifier 78, 80, 82, an integration capacitor 84, 86, 88 in parallel therewith, and a second switch 90, 92, 94 in parallel with the respective integration capacitor 84, 86, 88. The second switches 90, 92, 94 are initially closed.

When the card 10 is passed through the groove 6 in the direction of the arrow A, it passes by the lamp 24 and the leading edge of the card 10 then cuts the infrared beam which is emitted from the infrared emitting diode 20 to the optical switch 22, which comprises a photodiode and an associated amplifier. The optical switch 22 is thereby switched to send a signal to a control device 96 which acts to enable the three channels of the control circuitry, each channel being associated with a respective photodetector, thereby to determine whether or not the card 10 is genuine. The infrared emitting diode 20/optical switch 22 assembly is positioned downstream of the photodetectors 26, 28, 30 so that the three channels are always enabled at the same position of the card in the groove 6.

This is achieved by the control device 96 being activated upon receipt of the signal from the optical switch 22, to close the first switches 60, 62, 64 via a control line 98 and to open the second switches 90, 92, 94 via a control line 100. The DC output voltage signals 66, 68, 70 pass through the respective closed first switches 60, 62, 64 and are integrated by charge accumulation on the respective integration capacitors 84, 86, 88. The output of that integration circuit 72 which corresponds to wavelength A is fed to a reference comparator 102 along a line 104. The reference comparator 102 compares the integrated voltage with a reference voltage. When the integrated voltage attains the reference voltage, the reference comparator 102 sends a signal along line 105 to the control device 96 which then acts via control line 98 to open the first switches 60, 62, 64. In this way, the integration of charge in the three integration circuits 72, 74, 76 is halted when the voltage of the integration circuit 72 corresponding to wavelength A reaches a preset valve. The accumulated charge on the three integration capacitors 84, 86, 88 is retained due to the high input independance of the integration operational amplifiers 78, 80, 82 and the low leakage of the second switches 90, 92, 94. The three voltages due to the final accumulated charge on the three integration capacitors 84, 86, 88 represent the peak heights in the fluorescent emission spectrum at wavelengths A, B and C respectively. The integrated voltages in the B and C channels are then compared with that in the A channel and the ratios B/A and C/A are compared with preset valves for a genuine fluorescent material. The relative intensites derived at wavelengths A, B and C are known by prior calibration using a reference material and the apparatus of the illustrated embodiment is used to check whether or not the card 10 contains a fluorescent material which corresponds to that previously used during calibration.

The output from the integration circuit 72 for the A channel on the line 104 is fed to a first potentiometer 106 which has been preset during prior calibration of the circuit using a reference fluorescent material. The attenuated signal from the potentiometer 106 is a selected fraction of the voltage level on line 104 and is passed by a line 108 to a first input of a comparator 110. The output from the integration circuit 74 for the B channel is fed along a line 112 to a second input of the comparator 110. The comparator 110 is arranged to produce a high output on a line 114 if the voltage signal on line 108 is greater than that on line 112. The signal on line 112 is also fed to a first input of a further comparator 116 and the signal on line 108 is fed through a selected resistance 118 by a line 120 to a second input of the further comparator 116. Thus, the resistance 118 attenuates the voltage on line 108 by a selected amount. The further comparator 116 is arranged to produce a high output on a line 122 if the voltage signal on line 112 is greater than that on line 120. By the use of the two comparators 110 and 116 two attenuated signals representative of the integrated voltage of the A channel are compared with the integrated voltage of the B channel and the outputs of the comparators 110 and 116 are used to provide an indication of the relative magnitude of the signals from the integration circuits 72, 74 for the A and B channels.

Similar circuitry is employed to make a comparison of the relative magnitude of the signals from the integration circuits 74, 76 for the B and C channels. The signal from the integration circuit 72 for the A channel on line 104 is also fed to a second potentiometer 124 which has also been preset during prior calibration of the circuit using a reference fluorescent material. The attenuated output of the second potentiometer 124 is fed to a first input of a third comparator 126 by a line 128. The output from the integration circuit 76 is fed along a line 129 to a second input of the third comparator 126. The comparator is arranged to produce a high output on a line 130 if the voltage signal on line 128 is greater than that on line 129. The signal on line 129 is also fed to a first input of a fourth comparator 132 and the signal on line 128 is fed through a second selected resistance 134 by a line 136 to a second input of the fourth comparator 132. Thus, the second resistance 134 attenuates the voltage on line 128 by a selected amount. The fourth comparator 132 is arranged to produce a high output on a line 138 if the voltage signal on line 129 is greater than that on line 136. By the use of the third and fourth comparators 126 and 132 the two attenuated signals representative of the integrated voltage of the A channel are compared with the integrated voltage of the C channel and the outputs of the comparators 126 and 132 are used to provide an indication of the relative magnitude of the signals from the integration circuits 72, 76 for the A and C channels.

The outputs from the comparators 110, 116, 126 and 132 on lines 114, 122, 130 and 138 are fed to an AND gate 140. If the ratios of the integration voltages in the B and C channels to the A channel are the preset values the AND gate 140 will receive a high output signal on each of the lines 114, 122, 130 and 138 from the four comparators 110, 116, 126 and 132 and will produce an output signal on an output line 142 indicating that the correct card 10 has been passed through the groove 6. If a card 10 under test does not contain the correct fluorescent material which has the correct spectral characteristics as represented by the relative intensities of the wavelengths A, B and C, at least one of the lines 114, 122, 130 and 138 will not have a high output signal thereon from its respective comparator. The AND gate 140 will therefore not produce a signal.

When the card 10 has been removed from the groove 6 this is sensed by the optical switch 22 which activates the control device 96 to reset the control circuitry by returning the first switches 60, 62, 64 and the second switches 90, 92, 94 to their initial condition.

The output signal on output line 142, which gives an indication of the verification of the card 10, is employed to control the magnetic detecting head 18 and its associated circuitry. In a preferred arrangement in which the magnetic swipe reader 2 is incorporated in a telephone, the output signal on output line 142 is used to initiate the transmission of the signals, derived from the information stored in the magnetic strip 12, down the telephone line to the associated charge control system.

The present invention thus provides a means for verifying a card 10 having a magnetic strip which verifies the material of the card 10 on which the magnetic strip is disposed. Since a potentional counterfeiter would find it extremely difficult to reproduce a card having the required spectral properties which are verified in the apparatus of the invention, the security of the card is greatly increased.

Figure 5:
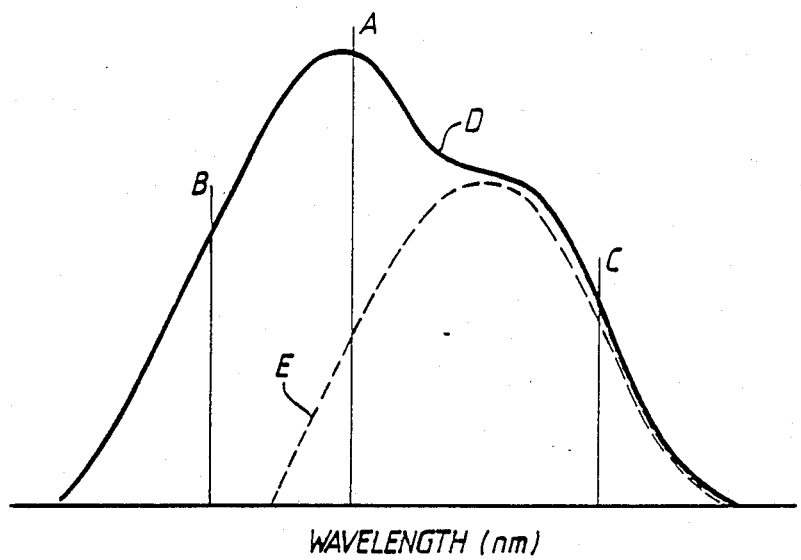
FIG. 5 shows a characteristic emission spectrum from a material which is fluorescent and phosphorescent.

In an alternative embodiment of the invention, the card contains a phosphorescent material in addition to or as an alternative to the fluorescent material of the embodiment described above. The material is again illuminated by ultraviolet radiation of a specific wavelength by the lamp 24. If the card 10 contains a short-lived phosphorescent material in addition to the fluorescent material, the emission spectrum obtained under steady illumination can be quite different from that which is obtained when ultraviolet radiation is removed and phosphorescence only is emitted. A typical emission spectrum is shown in FIG. 5. Curve D represents the composite emission spectrum during steady illumination for fluorescene and phosphorescence and curve E represents the emission spectrum in the absense of ultraviolet radiation for phosphorescence only. It may be seen that the relative intensities at the three wavelengths are significantly different between curve D (phosphorescence and fluorescence) and curve E (phosphorescence alone). For this arrangement, a further array of three photo-detectors is situated downstream of the above-described array of photo-detectors to monitor the afterglow (phosphorescence) emission from the card. Since phosphorescence can last for a period of time of from 1 ms to 1 second (or longer), if a further array of photo-detectors is placed downstream of the ultraviolet emitting lamp it can detect the presence of the phosphorescent material, including measuring its lifetime by operating in conjunction with a complementary set of further optical switches which can be arranged to measure the velocity of the card at each insertion. In some application it is sufficient merely to detect the presence of phosphorescence in order to check whether or not the card is genuine.

In a still further alternative arrangement, the card is verified by detecting the presence of an ultraviolet or infrared radiation absorber in a PVC layer of the card by detecting the ultraviolet or infrared reflectance of the card at one or more selected wavelengths of ultraviolet or infrared radiation. If a portion, or the whole, of the card is covered with an ultraviolet or infrared radiation absorbing plastics material or part or the whole of the card is printed with an ultraviolet or infrared radiation absorbing material, reflection of ultraviolet or infrared radiation from the card can be monitored using an appropriate photo-detector and ultraviolet-transmitting or infrared-transmitting filter. Thus the apparatus can include a fourth photo-detector (or any number of further photo-detectors) to measure ultraviolet or infrared reflection (or to characterise the spectral properties of an ultraviolet or infrared radiation absorbing material). The ultraviolet or infrared reflectance detection facility can be used or its own or in conjunction with fluorescence and/or phosphorence detection to verify whether or not the card is genuine.

In a further arrangement, the apparatus could be arranged to detect whether or not the signals recorded in the A channel are received at too high a rate (allowing for variation in the transmit speed of the card through the groove). A rate above a set threshold value could indicate that the level of fluorescence from the card is greater than a specified value and indicate that the card is a forgery.

In an additional alternative arrangement, the apparatus could employ, instead of the infrared emitting diode 20/optical switch 22 assembly, a magnetic flux detector which detects when the card is in the groove by detecting magnetic flux which is produced by the magnetic material of the magnetic strip.

I claim:

1. Apparatus for checking the authenticity of an article carrying a magnetic storage material which stores permanent characteristic information, the apparatus comprising means for irradiating the article with electromagnetic radiation of a particular spectral characteristic, means for detecting electromagnetic radiation which is emitted by or reflected from the article due to the irradiation thereof by the means for irradiating, means for determining whether the detected radiation has prescribed spectral characteristics and said means being operable to produce an authentication signal if the prescribed spectral characteristics are detected to indicate that the article is genuine and a magnetic detector means operable in response to said authentication signal to weed said characteristic information which is stored on the magnetic material.

2. Apparatus as claimed in claim 1 in which the irradiating means comprises means for producing at least one wavelength of ultraviolet radiation and in which the detecting means is operable to detect characteristics of the fluorescence emission spectrum emitted by a fluorescent material carried by the article.

3. Apparatus according to claim 1 wherein the means for detecting electromagnetic radiation comprises a plurality of optical filters each arranged to transmit a different wavelength and a plurality of photo-detectors, each being arranged to receive filtered radiation from a respective optical filter.

4. Apparatus according to claim 1 or claim 3 further comprising an article detector which detects when an article to be characterised or identified is at a testing station adjacent the means for irradiating and the means for detecting electromagnetic radiation, the article detector being operable to actuate the means for determining when the article is at the testing station.

5. Apparatus according to claim 4 wherein the means for determining is adapted to integrate values which are representative of the intensity of the detected radiation at predetermined wavelengths, to halt the integration of the values when one of the integrated values reaches a predetermined threshold and to compare the final integrated values thereby to determine whether or not the integrated values at the predetermined wavelengths correspond to respective prescribed values.

6. A method for checking the authenticity of an article carrying a magnetic storage material which stores permanent characteristic information, the method comprising the steps of:
   (a) irradiating the article with electromagnetic radiation of a particular spectral characteristic;
   (b) detecting electromagnetic radiation which is emitted by or reflected from the article due to the irradiation thereof by the means for irradiating;
   (c) determining whether the detected radiation has prescribed spectral characteristics and causing an authentication signal to be produced if the prescribed spectral characteristics are detected to indicate that the article is genuine; and,
   (d) in response to said authentication signal, reading said characteristic information which is stored on the magnetic material, the reading step being controlled in response to the detection in the determining step (c) of whether or not the article is genuine.

7. A method according to claim 6 wherein the electromagnetic radiation for irradiating the article is ultraviolet radiation of at least one wavelength adapted to excite fluorescence in a fluorescent material carried by the article.

8. A method according to claim 6 wherein the electromagnetic radiation is detected in step (b) by a plurality of optical filters each arranged to transmit a different wavelength and a plurality of photo-detectors, each being arranged to receive filtered radiation from a respective optical filter.

9. A method according to claim 6 or claim 8 wherein an article detector is arranged to detect when an article to be characterised or identified is at a testing station at which the article is irradiated in step (a), the article detector being operable to actuate the determining step (c) when the article is at the testing station.

10. A method according to claim 9 wherein the determining step (c) comprises the steps of:
   (i) integrating values which are representative of the intensity of the detected radiation at predetermined wavelengths;
   (ii) halting the integration of the values when one of the integrated values reaches a predetermined threshold; and
   (iii) comparing the final integrated values thereby to determine whether or not the integrated values at the predetermined wavelengths correspond to respective prescribed values.

11. A security article carrying a magnetic storage material thereon which stores characteristic information and a secure optical authentication material which has particular optical characteristics so that it emits electromagnetic radiation of prescribed spectral characteristics when it is irradiated with electromagnetic radiation of a particular spectral characteristic.

12. A security article as claimed in claim 11 in which the optical authentication material comprises a fluorescent material with a characteristic emission spectrum.

13. A security article as claimed in claim 11 or 2 in which the optical authentication material comprises a phosphorescent material.

14. A security article as claimed in claim 11 in which the optical authentication material is an ultraviolet radiation absorber.

15. A security article as claimed in claim 11 in which the optical authentication material is an infrared radiation absorber.

* * * * *